(12) United States Patent　　(10) Patent No.:　　US 6,994,358 B2
　　Roycroft　　　　　　　　　　　　(45) Date of Patent:　　Feb. 7, 2006

(54) BUMP STOP

(75) Inventor:　Terence James Roycroft, Waiuku (NZ)

(73) Assignee:　Gibbs Technologies Limited, (GB)

( * ) Notice:　Subject to any disclaimer, the term of this patent is extended or adjusted under 35 U.S.C. 154(b) by 29 days.

(21) Appl. No.:　10/332,735

(22) PCT Filed:　Jul. 17, 2001

(86) PCT No.:　PCT/GB01/03219

§ 371 (c)(1),
(2), (4) Date:　Apr. 15, 2003

(87) PCT Pub. No.: WO02/08000

PCT Pub. Date: Jan. 31, 2002

(65)　　Prior Publication Data

US 2004/0056445 A1　Mar. 25, 2004

(30)　　Foreign Application Priority Data

Jul. 21, 2000　　(GB)　...................................　0017782

(51) Int. Cl.
　　*B62B 13/18*　　(2006.01)
(52) U.S. Cl. ..................... 280/9; 280/124.17; 180/209; 440/12.5; 267/234; 267/242
(58) Field of Classification Search ......... 280/124.177, 280/86.5, 89, 89.11, 5.515, 5.519, 9; 267/233, 267/140, 234, 242, 243; 440/12.5; 180/209
See application file for complete search history.

(56)　　References Cited

U.S. PATENT DOCUMENTS 2,784,424 A　3/1957　Southerland (Continued)

FOREIGN PATENT DOCUMENTS

FR　　　22568215　　　1/1986

(Continued)

OTHER PUBLICATIONS

International Search Report dated Jun. 2, 1993.

(Continued)

*Primary Examiner*—Paul N. Dickson
*Assistant Examiner*—Toan C. To
(74) *Attorney, Agent, or Firm*—Young & Basile, P.C.

(57)　　ABSTRACT

Bump stop for an amphibious vehicle suspension having a member selectively movable between an operating position, and an inoperative position. This allows the suspension to retract road wheels along locus for conversion to marine mode. Bump stop free end may be moved by filling cavities with pressurized fluid. Alternatively, the entire bump stop may be rotated on a pivot by a hydraulic cylinder, an electric solenoid, manually or by any other mechanical means. Alternatively, the movable member may be a position in a cylinder, withdrawn against a return spring by hydraulic pressure, and may act against resilient snubber on the vehicle suspension. Bump pad has a curved undersurface, allowing the bump stop to be bent out of the way when the suspension is lowered.

19 Claims, 7 Drawing Sheets

U.S. PATENT DOCUMENTS

| | | | |
|---|---|---|---|
| 3,227,123 A | 1/1966 | Voight | 114/66.5 |
| 3,362,373 A | 1/1968 | Mycroft | |
| 3,421,472 A | 1/1969 | Oberg | |
| 3,653,332 A | 4/1972 | Olson, Sr. et al. | 105/215 C |
| 3,765,368 A | 10/1973 | Asbeck | 115/1 A |
| 3,771,812 A * | 11/1973 | Pierce et al. | 280/86.5 |
| 3,779,574 A | 12/1973 | Ow | 280/43.18 |
| 3,831,210 A | 8/1974 | Ow | 9/1 T |
| 4,958,584 A | 9/1990 | Williamson | 114/270 |
| 5,058,917 A | 10/1991 | Richardson | 280/704 |
| 5,192,101 A * | 3/1993 | Richardson | 280/86.5 |
| 5,536,036 A * | 7/1996 | Ehrlich | 280/124.128 |

FOREIGN PATENT DOCUMENTS

| | | |
|---|---|---|
| GB | 2 134052 | 8/1984 |
| WO | WO 93/16923 | 8/1993 |
| WO | WO 95/23074 | 8/1995 |

OTHER PUBLICATIONS

Search Report of the United Kingdom dated Feb. 8, 2001.

* cited by examiner

BUMP STOP

BACKGROUND OF THE INVENTION

The present invention relates to a bump stop and more particularly to a bump stop for the suspension of an amphibious vehicle.

An amphibious vehicle with a wheel retraction system requires a suspension bump stop in order to prevent excessive upward wheel travel movement when the vehicle is in land travel mode. However, when the wheels of the vehicle retract for marine mode, the bump stop should not interfere with the upward movement of the suspension.

SUMMARY OF THE INVENTION

According to a first aspect of the present invention there is provided, a bump stop for an amphibious vehicle, the bump stop comprising a member having a stop portion for engagement with part of a vehicle suspension to limit travel of the suspension system relative to the vehicle body, in which the member is selectively movable between an operative position, in which the stop portion is deployed for engagement with the part of the vehicle suspension system, and an inoperative position, in which the stop portion is not deployed for engagement with the part of the vehicle suspension system, the bump stop further comprising means for moving the stop portion between the operative and inoperative positions.

In a first preferred arrangement the member is resilient and is provided with at least one internal cavity connected to a fluid supply line. Preferably the stop portion moving means is provided by pressurised fluid supplied to the internal cavity, which pressurised fluid expands the cavity of the resilient member causing the resilient member to distort.

In a second preferable arrangement, the member is resilient and is adapted to be pivotally mounted to a fixed part of the vehicle. In this arrangement, the stop portion moving means may be provided by a fluid operated cylinder, a piston of which is connected to the resilient member. Movement of the piston causes the resilient member to rotate about the pivotal mounting. Alternatively, the resilient member may be moved by an electrically operated solenoid or manually, or by any other appropriate mechanical or electrical means.

In a third preferable arrangement, the member is slidably mounted in a cylinder. One end of the member may be formed as a piston which is biased by a spring to move the stop portion of the member to the operative position. Preferably pressurised fluid causes the piston and member to retract into the cylinder, against the bias of the spring, to the inoperative position.

In accordance with a second aspect of the invention, there is provided an amphibious vehicle having a bump stop in accordance with the first aspect of the invention. In a preferred embodiment, the part of the vehicle suspension system which engages the member is resilient.

BRIEF DESCRIPTION OF THE DRAWINGS

Several embodiments of the invention will now be described, by way of example only, with reference to the accompanying drawings in which.

DETAILED DESCRIPTION OF THE PREFERRED EMBODIMENTS

Figure 1:
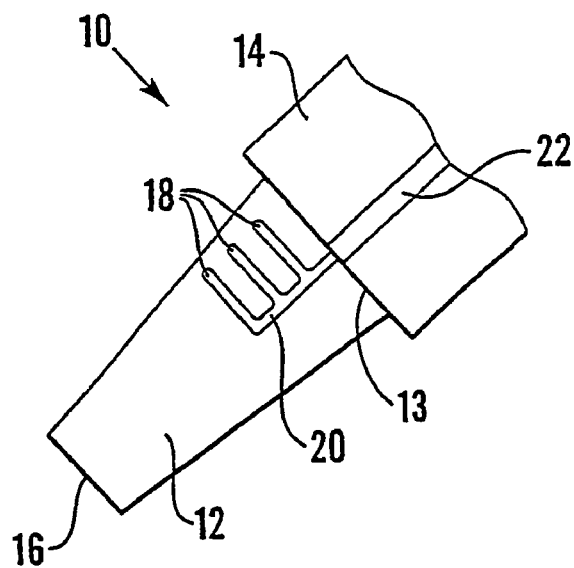
FIG. 1 is a sectional view through a first embodiment of a bump stop for an amphibious vehicle in accordance with the invention, showing the bump stop in an operative position.

Referring firstly to FIG. 1, a first embodiment of a bump stop is indicated generally at 10. The bump stop 10 comprises a resilient member 12 which is attached at one end 13 to a rigid base 14, and has a free end 16 which forms a stop portion for contact with part of a vehicle suspension. The resilient member 12 is shaped substantially as a truncated cone or pyramid and is made of rubber, but may be made of any suitable resilient material. The base 14 is mounted to the structure 24 of a vehicle, see FIG. 7.

Figure 2:
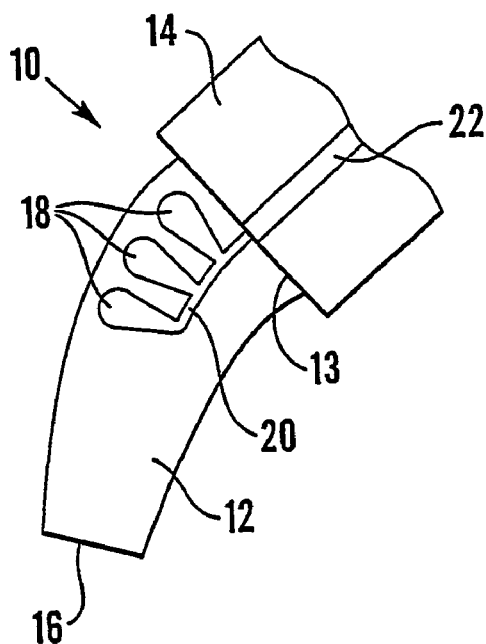
FIG. 2 is a view similar to that of FIG. 1 but showing the bump stop in an inoperative position.

A series of elongate internal cavities 18 are provided to one side of the resilient member 12 and are connected by a connecting cavity 20. A fluid supply line 22 in the base 14 connects with the connecting cavity 20 for supplying pressurised fluid to the internal cavities 18. As can be seen from FIG. 2, when the internal cavities 18 are expanded by the force of pressurised fluid, the resilient member 12 distorts to one side, (to the right hand side as viewed).

Figure 7:
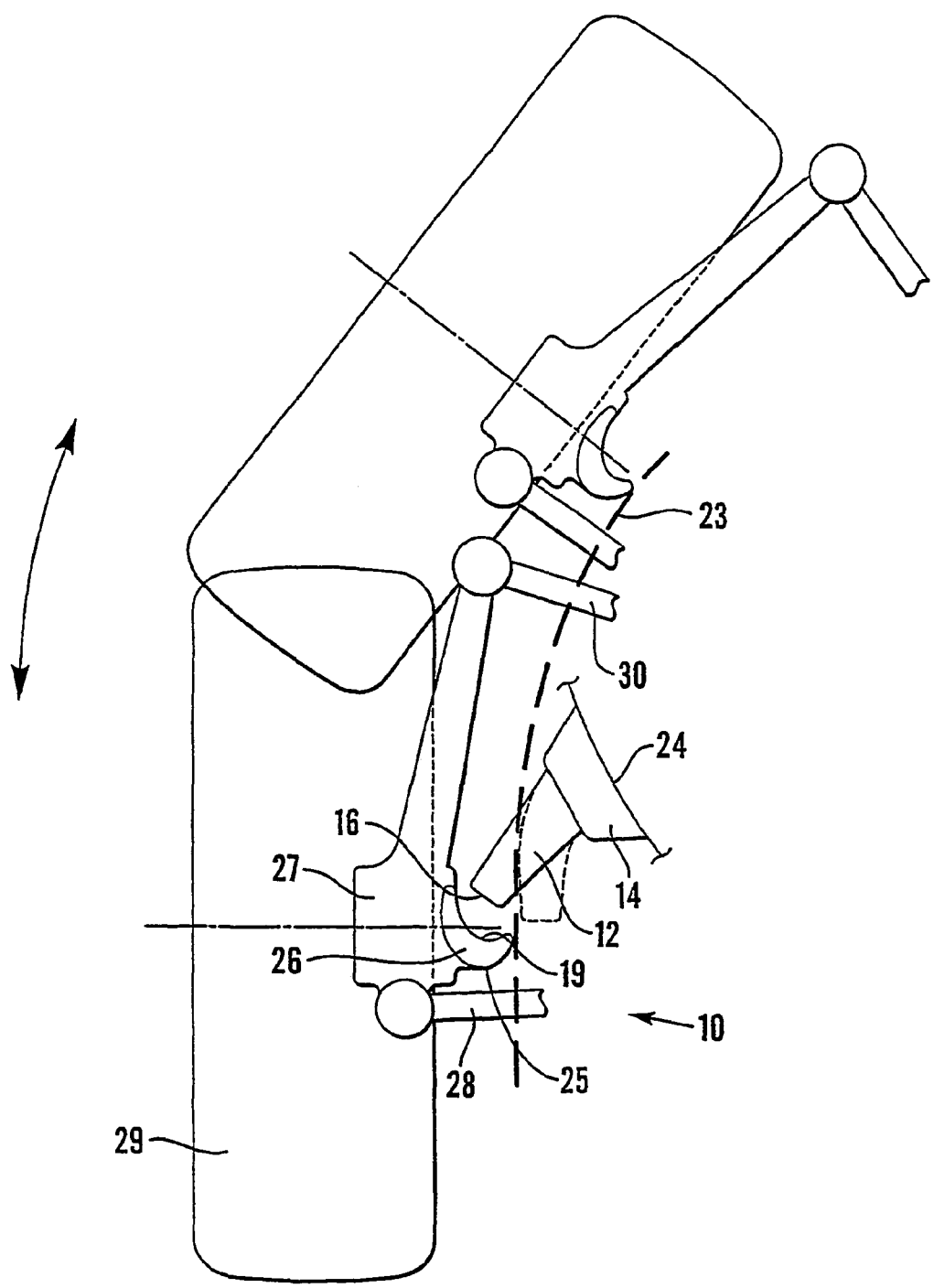
FIG. 7 is a side view partly in section, a suspension system of an amphibious vehicle including a bump stop of the type shown in FIGS. 1 & 2.

Referring now to FIG. 7, a bump pad 26 is integrally formed with, or attached to a wheel support upright 27 of a suspension system of an amphibious vehicle. The resilient member 12 and rigid base 14 are mounted on the structure 24 of the vehicle in alignment with the bump pad 26. The wheel support upright 27 is mounted between lower and upper control arms 28,30 which are pivotally mounted to the structure 24 of the vehicle in conventional manner. The wheel support upright 27 mounts a wheel 29, also in conventional manner. The upper surface 19 of the bump pad 26 is cup shaped for receiving the end 16 of the bump stop 10. Furthermore, the lower surface 25 of the bump pad 26 is formed as a smooth curve, the purpose of which will be described below. The wheel 29 is shown in the lowered position for use of the vehicle in a road mode and a retracted position in which the wheel is raised for use of the vehicle on water in a marine mode.

Figure 8:
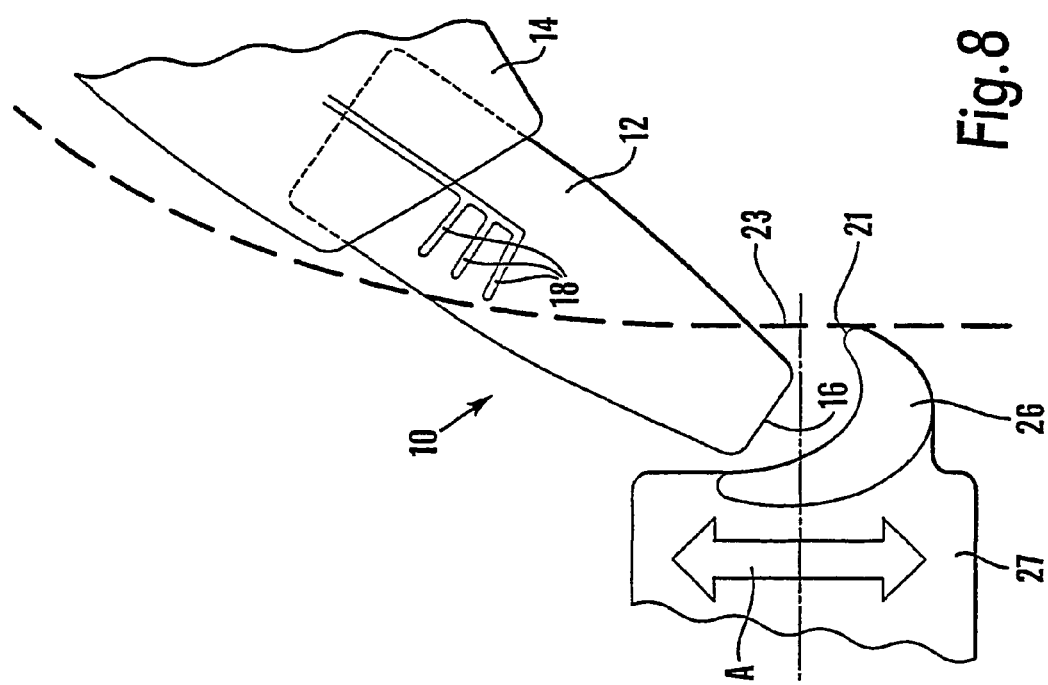
FIG. 8 is an enlarged sectional view of part of the suspension system of FIG. 7 showing the bump stop in the operative position.

The operation of the bump stop 10 will now be described with reference to FIGS. 7 to 11. In FIGS. 7 & 8, the bump stop 10 is shown in an operative position, in which the resilient member 12 assumes its rest shape. The bump pad 26 is positioned below the end 16 of the resilient member 12, and moves with the wheel support upright 27 relative to the vehicle body as the vehicle travels over land in road mode, as indicated by arrow A. The tip 21 of the bump pad 26 moves in an arc, as indicated by the dotted line 23.

Figure 9:
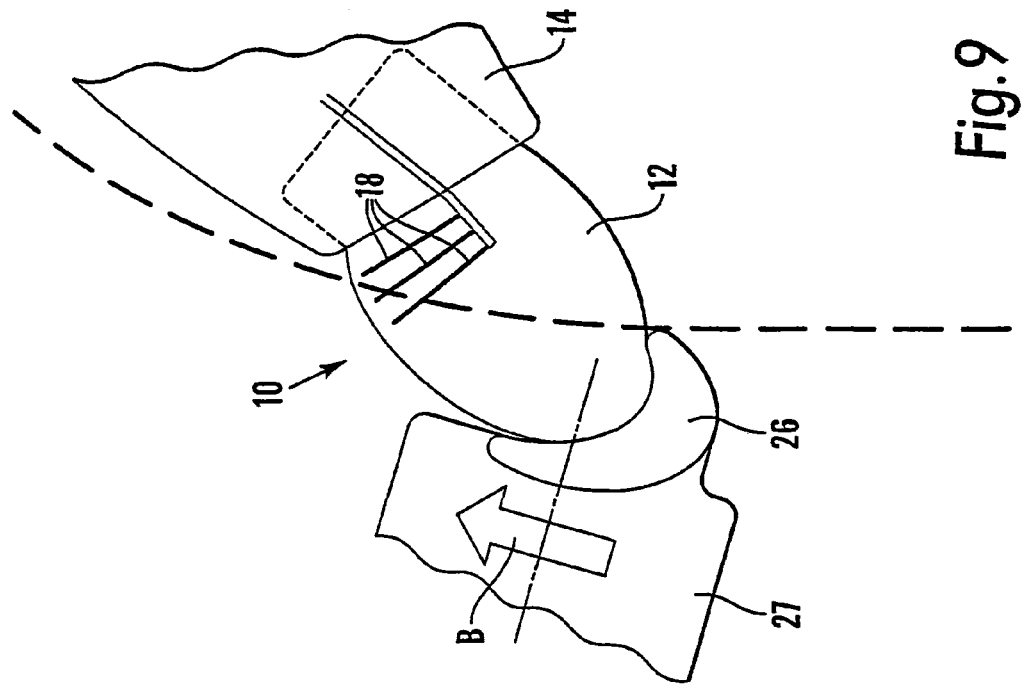
FIG. 9 is a view similar to that of FIG. 8 showing the bump stop in the operative position, with the bump stop limiting upward movement of the suspension system.

As can be seen from FIG. 9, when the suspension system moves upwards relative to the vehicle in the direction indicated by arrow B, the cup shaped upper surface 19 of bump pad 26 contacts the end or stop portion 16 of the resilient member 12. The resilient member 12 is compressed until the resilient member 12 prevents the pad 26, and hence the wheel support upright 27, wheel 29 and control arms 28,30, from further relative upward movement.

The bump stop 10 can be selectively moved between the operative position and the inoperative positions by pumping pressurised fluid, for example hydraulic oil, water or air into or out from the fluid supply line 22. As described with reference to FIG. 2, the pressurised fluid flows into the connecting cavity 20 and into the internal cavities 18, which causes the cavities 18 to expand. The expansion of the cavities 18 forces the resilient member 12 to distort, and the end 16 of the resilient member 12 moves out of axial alignment with the base 14 in a direction away from the side of the internal cavities 18.

Figure 10:
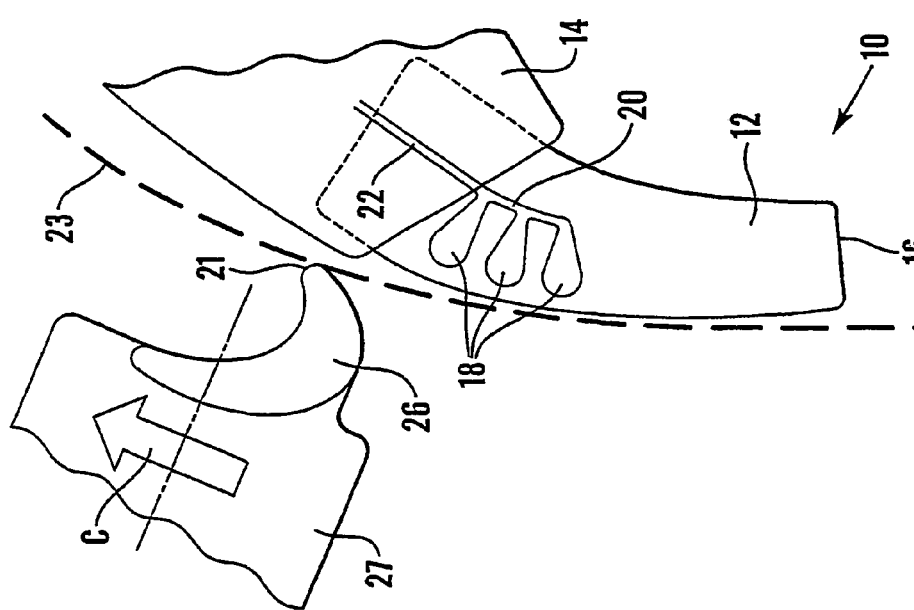
FIG. 10 is a view similar to that of FIG. 8 but showing the bump stop in the inoperative position, and the movement of part of the suspension system towards a retracted position for marine use.

Referring now to FIG. 10, when the amphibious vehicle has entered water and it is necessary to retract the suspension system, pressurised fluid is pumped into the cavities 18, and the resilient member distorts as described above into the inoperative position. The end 16 of the resilient member 12 is now positioned away from the bump pad 26, allowing the tip 21 of the bump pad to move past the resilient member 12, as indicated by arrow C, so that the wheel can be moved to the retracted position. When the bump pad 26 has moved past the bump stop 10 to the retracted position, release of the pressurised fluid allows the resilient member 12 to assume its rest or operative shape.

Figure 11:
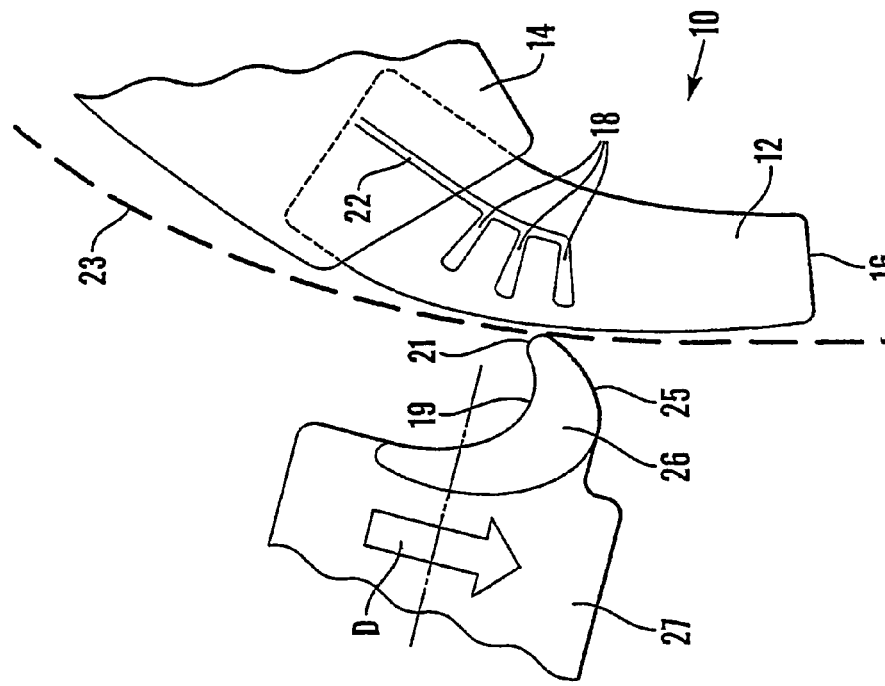
FIG. 11 is a view similar to that of FIG. 10 showing movement of part of the suspension system from the retracted position towards an extended position for road mode use.

When it is required to deploy or lower the suspension system for land travel mode from the retracted position, the wheel support upright 27 moves downwards as indicated by arrow D in FIG. 11. As the tip 21 of the bump pad 26 follows the arc 23, shown in dotted outline, the underside 25 of the bump pad 26 contacts the resilient member 12 and forces the resilient member to distort towards the inoperative position. Consequently, the bump pad 26 is able to move past the bump stop 10 in the downward direction without need for supplying pressurised fluid to the cavities 18. The fluid control circuit (not shown) is therefore simpler than the circuit would be if the pressurised fluid had to be supplied for movement of the bump stop 10 during wheel deployment.

A second embodiment of a bump stop in accordance with the invention will now be described with reference to FIGS. 3 and 4. The bump stop is indicated generally at 40, and comprises a resilient member 42 which is attached at one end 43 to a support member 44, and has a free end 46 which forms a stop portion. The resilient member 42 is shaped substantially as a truncated cone or pyramid and is made of rubber, but may be made of any suitable resilient material. The support member 44 is pivotally mounted 48 to a rigid base 50, which is mounted to the structure 24 of a vehicle, see FIG. 7, as in the previous embodiment described.

A fluid operated cylinder 52 is mounted to one side of the base 50, and comprises a single port 53, a piston 54, a piston rod 56 and a spring 58. An end 60 of the piston rod 56 is pivotally mounted 62 to the support member 44. The spring 58 is positioned between a back wall 64 of the cylinder 52 and the piston 54, and biases the piston 54 and piston rod 56 to an extended position. Pressurised fluid supplied to the cylinder 52 through the port 53 acts against the piston 54 and the bias of the spring 58 to retract the piston rod 56 into the cylinder 52.

Figure 3:
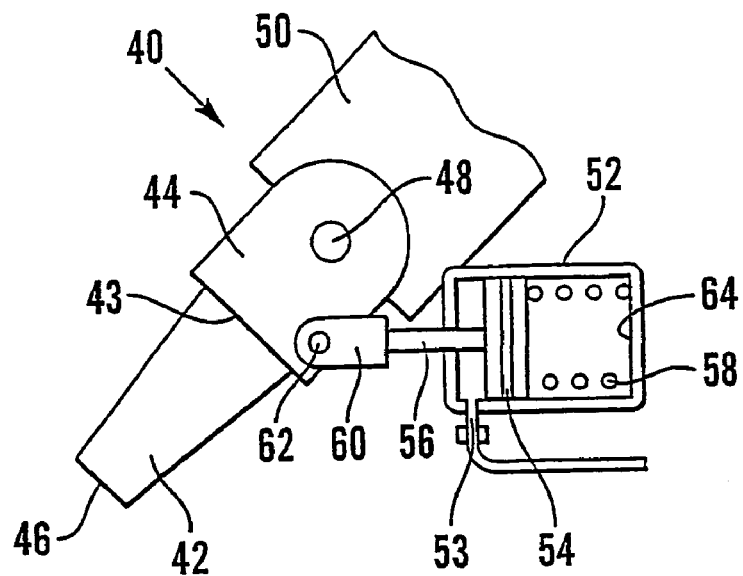
FIG. 3 is sectional view through a second embodiment of a bump stop for an amphibious vehicle in accordance with the invention, showing the bump stop in the operative position.
Figure 4:
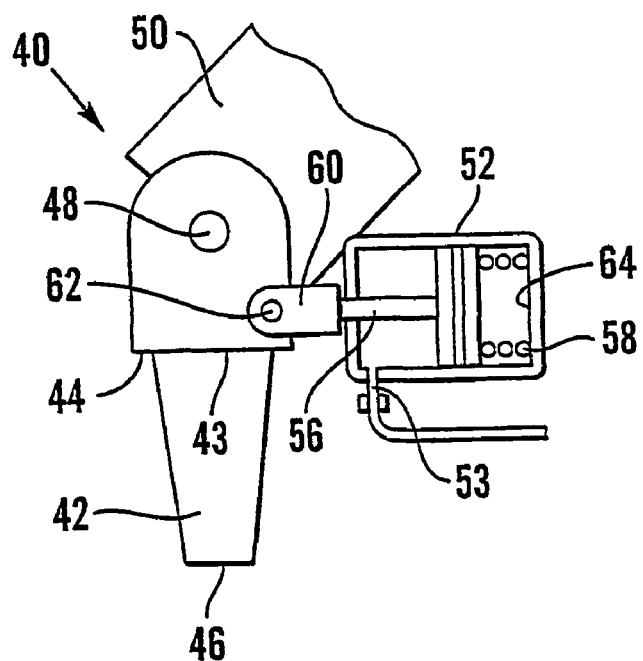
FIG. 4 is a view similar to that of FIG. 3 but showing the bump stop in an inoperative position.

In operation, when no pressurised fluid is supplied to the cylinder 52, the piston rod 56 is extended, and the resilient member 42 is in the operative position, shown in FIG. 3. When it is desired to retract the suspension system of the vehicle, pressurised fluid is supplied to the cylinder 52 and the piston rod retracts as described. This causes the support member 44 to rotate about the pivotal mounting 48 and moves the end 46 of the resilient member 42 out of the path of the bump pad 26, to the position shown in FIG. 4. As in the previous embodiment described, when the suspension system is deployed to road mode from the retracted position in marine mode, the underside 25 of the bump pad 26 forces the resilient member 12 to one side.

Figure 5:
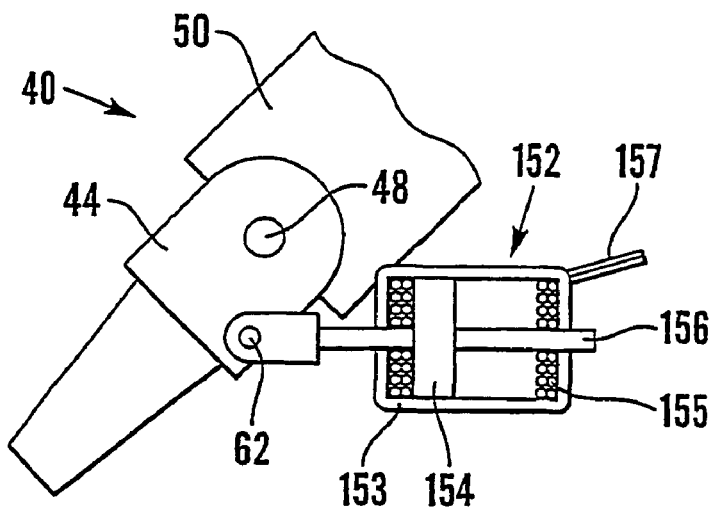
FIG. 5 is a view similar to that of FIG. 3 but showing an modification to the second embodiment in which the stop portion is moved by an electric solenoid.
Figure 6:
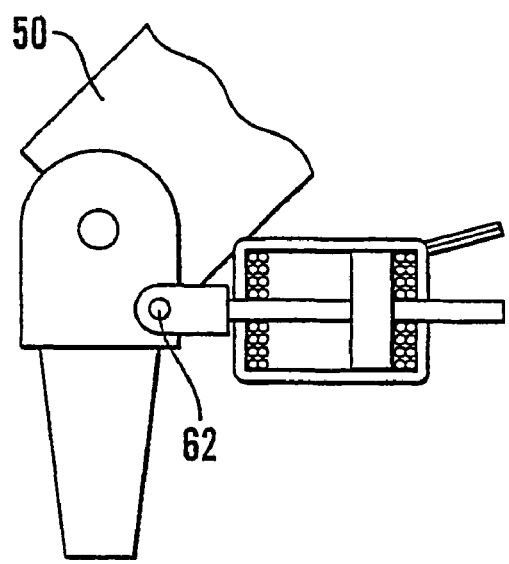
FIG. 6 is a view similar to that of FIG. 5 but showing the bump stop in an inoperative position.

FIGS. 5 & 6 show a modification to the second embodiment in which the fluid operated cylinder 52 is replaced by a double acting electric solenoid 152. Parts in common with those shown in FIGS. 3 & 4 are given the same reference numerals.

The solenoid 152 has coils 153 and 155, a yoke 154, rod 156, and electrical connections 157. The yoke 154 is connected to the support member 44 by the rod 156. Preferably, the solenoid is a latching solenoid. Depending on the electrical signals fed to the coils, the bump stop can be moved between the operative position shown in FIG. 5 and the inoperative position shown in FIG. 6.

Rather than a double acting solenoid, a single acting solenoid could be used, rendered reversible by changing the polarity.

Figure 12:
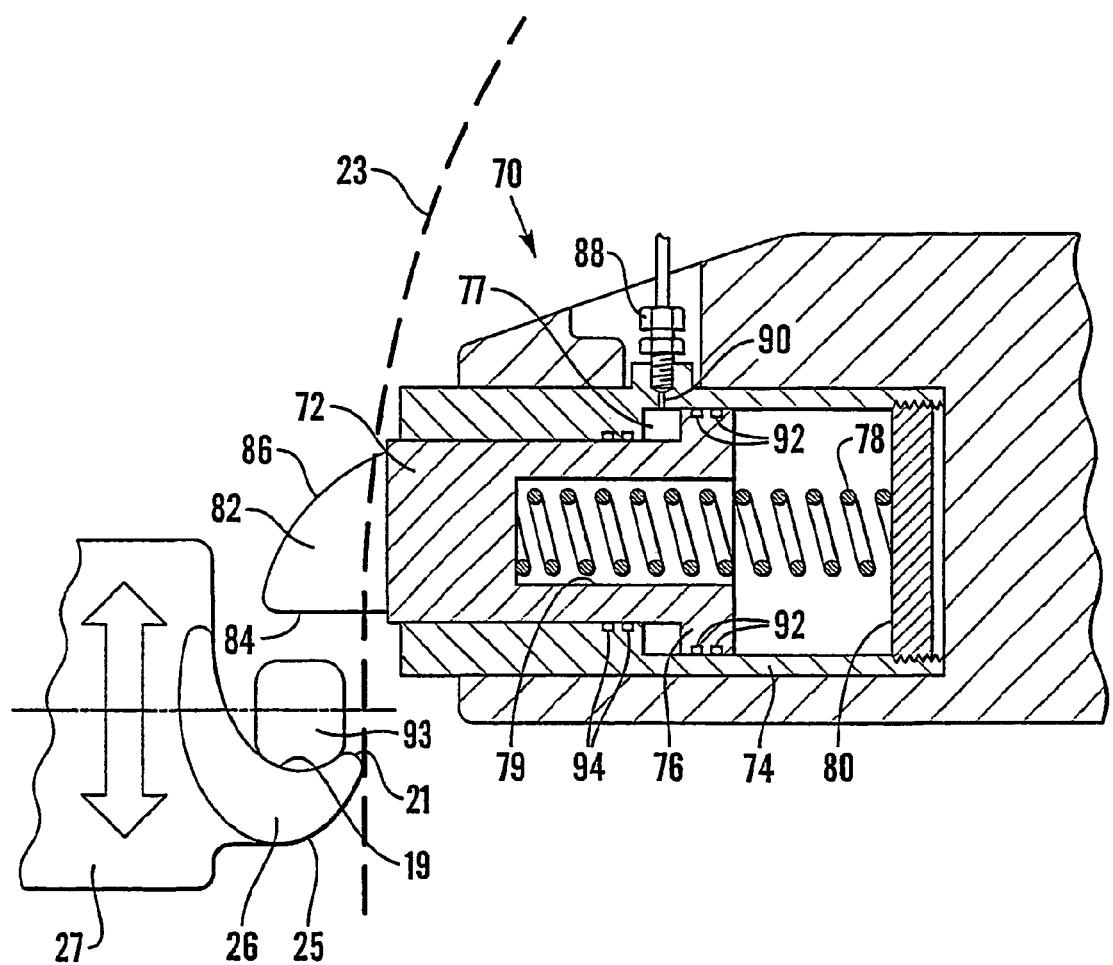
FIG. 12 is a sectional view through a third embodiment of a bump stop in accordance with the invention, showing the bump stop in the operative position.

A third embodiment of a bump stop in accordance with the invention will now be described with reference to FIG. 12. The bump stop, indicated generally at 70, comprises a member 72 slidably mounted in a cylinder 74. A piston 76 is formed at one end of the member 72 and is located in a piston chamber 77 within the cylinder 74. A spring 78, which locates in an internal recess 79 of the member 72 and engages an end cap 80 of the cylinder 74, biases the member 72 out of the cylinder to the operative position. The other end of the member 72 extends out of the cylinder 74 in the operative position and is formed as a latch 82, having a flat lower surface 84 which forms a stop portion, and a curved upper surface 86.

A pressure fitting 88 is provided in the cylinder 74, in communication with a port 90, which opens into the piston chamber 77. Pressurised fluid supplied to the fitting 88 enters the chamber 77 and causes the piston 76 and consequently the member 72 to move to the right, as viewed, against the action of the spring 78. Seals 92 seal between the piston 76 and the internal wall of the cylinder 74, and seals 94 seal between the member 72 and the internal wall of the cylinder 74. The member 72 including the latch 82 can therefore be drawn into the cylinder 74, which is the inoperative position. When the pressure of the fluid is relieved, the bias of the spring extends the member 72 to the operative position. The cylinder 74 is mounted to the vehicle body.

In this arrangement, the member 72 is not resilient, and therefore a resilient snubber 93 is attached to the cup shaped upper surface 19 of the bump pad 26.

In operation, the member 72 is biased out of the cylinder 74 by the spring 78 in operational mode, and the latch 82 is positioned in the path of the bump pad 26. As in the previous arrangements, the bump pad 26 moves in an arc, and the path of the tip 21 is indicated by the dotted line 23. The wheel support upright 27 and the bump pad 26 are prevented from moving upwards past the latch 82 of the member 72, because the bump pad 26 and snubber 93 engage the flat surface 84 of the latch 82, and limit the upward movement.

When it is desired to retract the wheels for marine mode, pressurised fluid is supplied through the port 90, which causes the piston 76 and the member 72 to retract by sliding into the cylinder 74, against the bias of the spring 78, to the inoperative position. The latch 82 is contained in the cylinder 74 and allows the bump pad 26 with snubber 93 to pass to the retracted position. Relief of the fluid pressure allows the bias of the spring 78 to push the member 72 and latch 82 from the inoperative position to the operative position.

When the suspension moves back towards the road mode position from the retracted marine mode position, the smooth curved underside 25 of the bump pad 26 frictionally engages the upper curved surface 86 of the latch 82, and pushes the latch 82 and member 72 into the cylinder against the bias of the spring 78.

In all of the embodiments it should be noted that if the pressurised fluid supply to the bump stop 10, 40, 70 fails, then the bump stop is always resiliently deployed to the operative position. Furthermore, the suspension system can always be deployed to road mode because in the movement of the bump pad from the retracted to the deployed position, the member is moved to one side by frictional engagement.

In other arrangements (not shown), the member may be moved manually, or by any other appropriate mechanical or electrical means.

What is claimed is:

1. A bump stop for an amphibious vehicle having a land travel mode and a marine mode, the bump stop comprising:
    a resilient member having a stop portion for engagement with a part of a vehicle suspension for limiting travel of the suspension system relative to the vehicle body during the land travel mode;
    wherein the member is selectively movable between an operative position, in which the stop portion is deployed for engagement with the part of the vehicle suspension system, and an inoperative position, in which the stop portion is not deployed for engagement with the part of the vehicle suspension system;
    and the bump stop further comprises means for moving the stop portion between the operative and inoperative positions.

2. A bump stop as claimed in claim 1, in which the resilient member is provided with at least one internal cavity connectable to a pressurised fluid supply line.

3. A bump stop as claimed in claim 2, adapted such that when pressurised fluid is supplied to the internal cavity, the pressurised fluid expands the cavity of the resilient member causing the resilient member to distort.

4. A bump stop as claimed in claim 1 in which the resilient member is adapted to be pivotably mounted to a part of the vehicle which is fixed relative to the vehicle suspension.

5. A bump stop as claimed, in claim 4 in which the stop portion moving means comprises a fluid operated cylinder and piston, one of the piston and the cylinder being connected to the resilient member, the other of the piston and the cylinder being connectable to the vehicle body.

6. A bump stop as claimed in claim 5 in which movement of the piston in the cylinder causes the resilient member to rotate about the pivotable mounting.

7. A bump stop as claimed in claim 4 in which the stop portion moving means comprises an electrically operated solenoid.

8. A bump stop as claimed in claim 1 in which the member is slidably mounted in a cylinder.

9. A bump stop as claimed in claim 8 in which an end of the member is formed as a piston which is biased by a spring to the operative position.

10. A bump stop as claimed in claim 9, in which pressurised fluid causes the piston and member to retract into the cylinder, against the bias of the spring, to the inoperative position.

11. An amphibious vehicle comprising a bump stop as claimed in claim 1.

12. The amphibious vehicle of claim 1 in which the part of the vehicle suspension system which engages the member is resilient.

13. The bump stop as claimed in claim 1, further comprising a second resilient member mountable to the suspension system, said second resilient member and the stop portion being engageable for limiting travel of the suspension system relative to the vehicle body; and
    wherein the stop portion is selectively movable between the operative portion, in which the stop position is deployed for engagement with the second resilient member, and an inoperative position, in which the stop portion is not deployed for engagement with the second resilient member.

14. A bump stop as claimed in claim 13 in which the stop portion moving means comprises a cylinder and piston, one of the piston and the cylinder being connected to the stop portion, the other of the piston and the cylinder being connectable to the vehicle body.

15. A bump stop as claimed in claim 14 in which the piston is biased by a spring to the operative position.

16. A bump stop as claimed in claim 15 in which pressurised fluid causes the piston and stop portion to retract with respect to the cylinder, against the bias of the spring, to the inoperative position.

17. A bump stop as claimed in claim 14, wherein the resilient member is a spring and the second resilient member is a resilient snubber on the suspension system, said spring is biased to the operative position.

18. A bump stop as claimed in claim 17, wherein applied pressurised fluid moves the spring and stop portion to the operative position.

19. An amphibious vehicle comprising a bump stop as claimed in claim 13.

* * * * *